United States Patent [19]
Plymale

[11] Patent Number: 6,029,565
[45] Date of Patent: Feb. 29, 2000

[54] ROTATING BARBECUE GRILL

[76] Inventor: Howard D. Plymale, 1535 N. College Ave., Harrisonberg, Va. 22802

[21] Appl. No.: 09/204,681

[22] Filed: Dec. 3, 1998

[51] Int. Cl.[7] .............................. A47J 37/08; A47J 43/18
[52] U.S. Cl. ......................... 99/397; 99/427; 99/443 R; 99/345; 126/41 R
[58] Field of Search .................. 99/345, 395, 397, 99/409, 427, 443 R; 126/41 B, 41 R

[56] References Cited

U.S. PATENT DOCUMENTS

| | | | |
|---|---|---|---|
| 1,786,300 | 12/1930 | Harrison | 99/345 X |
| 1,993,607 | 3/1935 | Kalgren | 99/427 |
| 3,220,336 | 11/1965 | Hoover | 99/443 R |
| 3,657,995 | 4/1972 | Adamitis | 99/443 R |
| 4,103,606 | 8/1978 | Gitcho | 99/443 C |
| 4,355,569 | 10/1982 | Sage | 99/443 R |
| 5,421,318 | 6/1995 | Unruh | 126/25 A |
| 5,431,093 | 7/1995 | Dodgen | 99/427 |
| 5,562,022 | 10/1996 | Scmid et al. | 99/421 H |

*Primary Examiner*—Reginald L. Alexander
*Attorney, Agent, or Firm*—Patent & Trademark Services; Joseph H. McGlynn

[57] ABSTRACT

A grill which can be used to cook a variety of items with chicken being the preferred item. The grill has a rotating cooking surface in the shape of a wheel and the items to be cooked are placed around the circumference of the wheel. The heat source is positioned along the axis of the wheel and there is a grease shield positioned to catch grease drippings from food items on the wheel. In addition a supply of barbecue sauce is positioned adjacent the lowest portion of the wheel so the food items to be cooked will pass through the sauce as the wheel rotates.

11 Claims, 2 Drawing Sheets

ROTATING BARBECUE GRILL

BACKGROUND OF THE INVENTION

This invention relates, in general, to grills and, in particular, to a rotating barbecue grill.

DESCRIPTION OF THE PRIOR ART

In the prior art various types of grills have been proposed. For example, U.S. Pat. No. 4,103,606 to Gitcho discloses a cooking device incorporated into a towable trailer which has a conveyor belt which transfers the food across a cooking source.

U.S. Pat. No. 5,421,318 to Unruh et al discloses a rotating spit which is operated by a crank that can be attached to a barbecue.

U.S. Pat. No. 5,431,093 to Dodgen discloses a barbecue which has containers for food attached to a rotating wheel and a heat source on the outside of the wheel.

U.S. Pat. No. 5,562,022 to Schmid et al discloses an oven which has a rotating cooking spit incorporated therein.

SUMMARY OF THE INVENTION

The present invention is directed to a grill which can be used to cook a variety of items, with chicken being the preferred item. The grill has a rotating cooking surface in the shape of a wheel and the items to be cooked are placed around the circumference of the wheel. The heat source is positioned along the axis of the wheel and there is a grease shield positioned to catch grease dripping form food items at the top of the wheel. In addition a supply of barbecue sauce is positioned adjacent the lowest portion of the wheel so the items to be cooked will pass through the sauce as the wheel rotates.

It is an object of the present invention to provide a new and improved grill which will more efficiently cook a variety of items.

It is an object of the present invention to provide a new and improved grill which incorporates a heat source in a position to more efficiently cook a variety of items.

It is an object of the present invention to provide a new and improved grill which will apply a sauce to the items to be cooked while they are cooking.

These and other objects and advantages of the present invention will be fully apparent from the following description, when taken in connection with the annexed drawings.

DESCRIPTION OF THE PREFERRED EMBODIMENT

Figure 1:
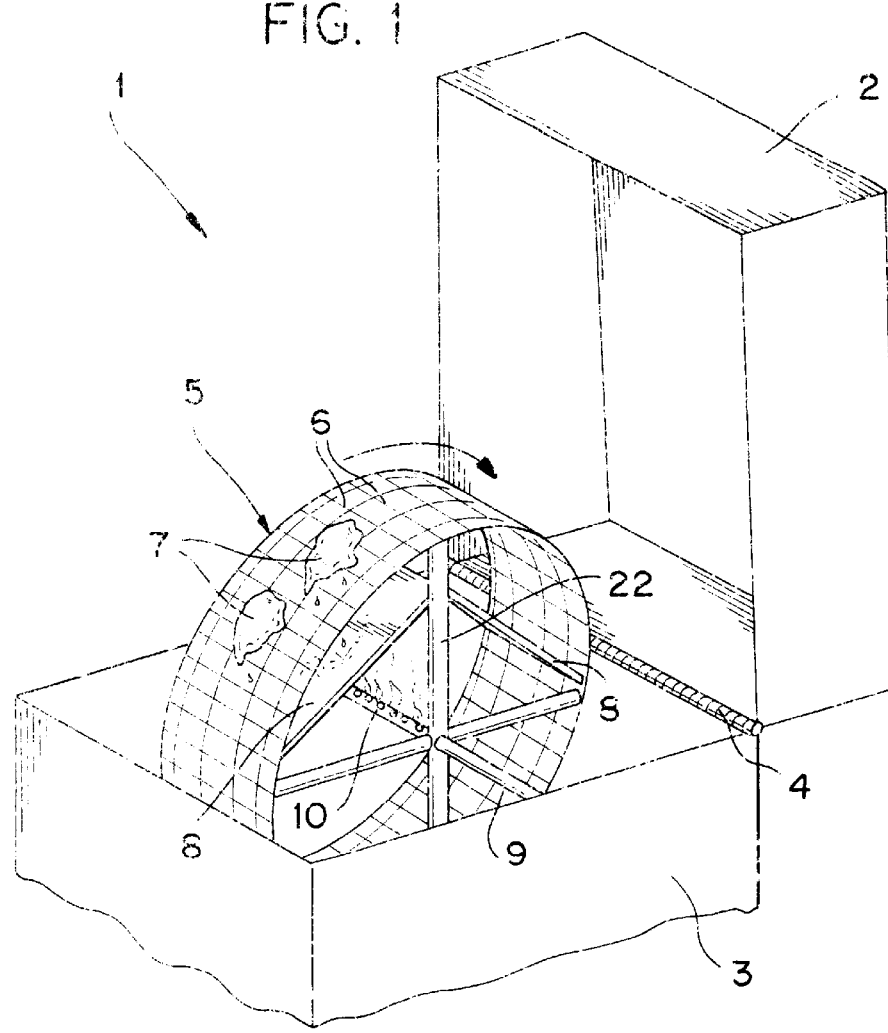
FIG. 1 is a partial perspective view of the present invention.

Referring now to the drawings in greater detail, FIG. 1 shows the rotating grill 1 of the present invention. The rotating portion of the grill will be housed in a container 3 which has a cover 2 attached thereto by a hinge 4. It should be noted that how the cover is attached to the container 3 is not critical and the cover can be attached in any conventional manner. For example, the hinge could be eliminated and the cover could be fully detachable from the container 3.

Attached to the container 3 is a rotating wheel 5 which has crossed wires 6 which form a surface to attach the food items 7 to be cooked. The preferred food items 7 are chicken parts, such as chicken breasts, however, any food item which can be attached to the surface 6 could be cooked on the grill. The wheel 5 is mounted on an axle 9 which has a series of apertures 10 spaced therealong. The apertures 10 will allow the fuel, such as, but not limited to, propane gas, to be ignited and a heating or cooking flame will be produced inside the wheel 5. Therefore, the axle 9 servers two functions, one is to rotatably support the wheel 5, and the other is too provide a cooking flame, for the food items 7, that is inside the wheel 5. Since the source of cooking heat is inside the wheel, the heat will be more efficiently applied to the items 7. That is, since the food items 7 surround the source of heat, the food items will tend to contain the heat within the wheel, thereby preventing the heat from readily escaping into the surrounding air.

Also shown in FIG. 1 is the position of the grease shield 8. As the food items are rotated to the top of the wheel 5 any grease that might drip to the bottom of the container 3 will be caught by the grease shield 8. Why this is an important aspect of the present invention will be explained more fully below. In addition the grease shield can be attached to support frame 22 in any conventional manner as long as the shield is held in the position shown.

Figure 2:
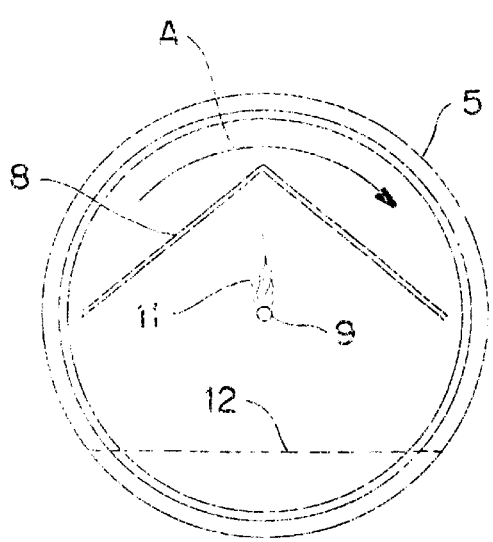
FIG. 2 is a partial end view of the present invention showing the location of the grease shield.

FIG. 2 shows the relative position of the heat shield 8 with respect to the wheel 5. As shown the heat shield 8 will protect the axle 9 with the cooking flame 11 from the grease drippings from the food items as they reach the top of the wheel 5. Because of its close proximity to the flame, the grease shield becomes very hot during the cooking process. As the heat from the flame rises it makes the top the hottest part of the grill. The products being cooked release most of the fat or liquid at the top of the wheel where it is the hottest. This hot liquid drips down and is caught by the grease shield 8, where it is burned and turns into smoke. The smoke, in turn rises toward the food items as they are rotated to the top of the wheel, and the smoke adds flavoring and color to the final cooked product.

In addition, the bottom of the container has a supply of sauce for the food items 7. The sauce level is represented by the dotted line 12 in FIG. 2. As the wheel 5 rotates, as shown by the arrow A, the food items, attached to the outside of the wheel 5, will be passed through the sauce 12. The sauce will coat the food items, thereby adding flavor to them and, in addition, prevent the food items from burning. Since the sauce 12 is in the lower portion of the container, grease that will drip from the food items at the top of the wheel will tend to drip into the sauce. In order to prevent the sauce from being contaminated with grease, the heat shields 8 are positioned to catch the grease.

Figure 3:
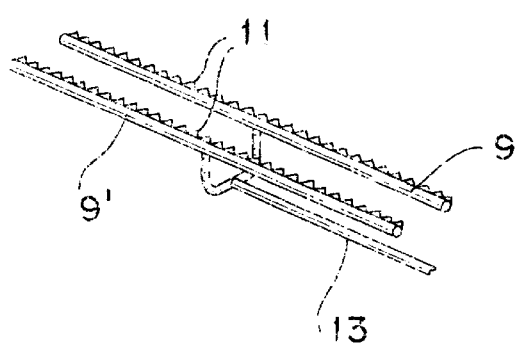
FIG. 3 is a view of another embodiment of the heat source of the present invention.

FIG. 3 shows a second embodiment of the axle 9. In this embodiment a second source of heat 9' is attached to the axle 9 to supply a flame 11 in order to produce more heat when a large number of food items are attached to the outside of the wheel 5. Both 9 and 9' are supplied with cooking gas through a single supply line 13 which can be attached to a source of gas by any conventional means (not shown).

Figure 4:
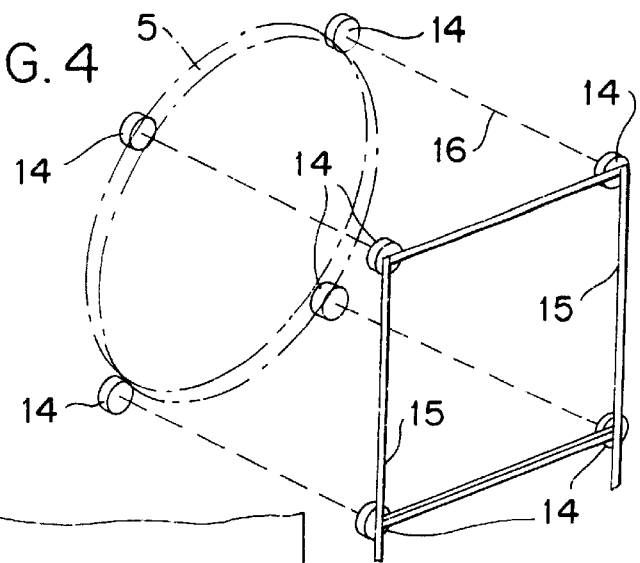
FIG. 4 is a schematic view showing the driving wheels for rotating the grill of the present invention.

FIG. 4 shows one method of rotating wheel 5. This method will be used with large wheels 5 in order to support the non-rotating items, such as the burner 9 and the grease shield 8 at both ends. The wheel 5 is only schematically shown in the drawing to indicate the relative positions of the wheel and the rotating means. The rotating means comprises a frame 15, 16 which will support wheels 14. At least one of the wheels 14 will be connected to a motor by any conventional means, such as a sprocket chain. When the motor is turned on, the wheel 14, connected thereto, will engage and rotate the wheel 5 with the food items thereon. Also, it should be noted that the wheels shown in FIG. 4 is merely one way of rotating the wheel 5. Other means can be used such as manually rotating the wheel 5 with a crank or handle.

Figure 5:
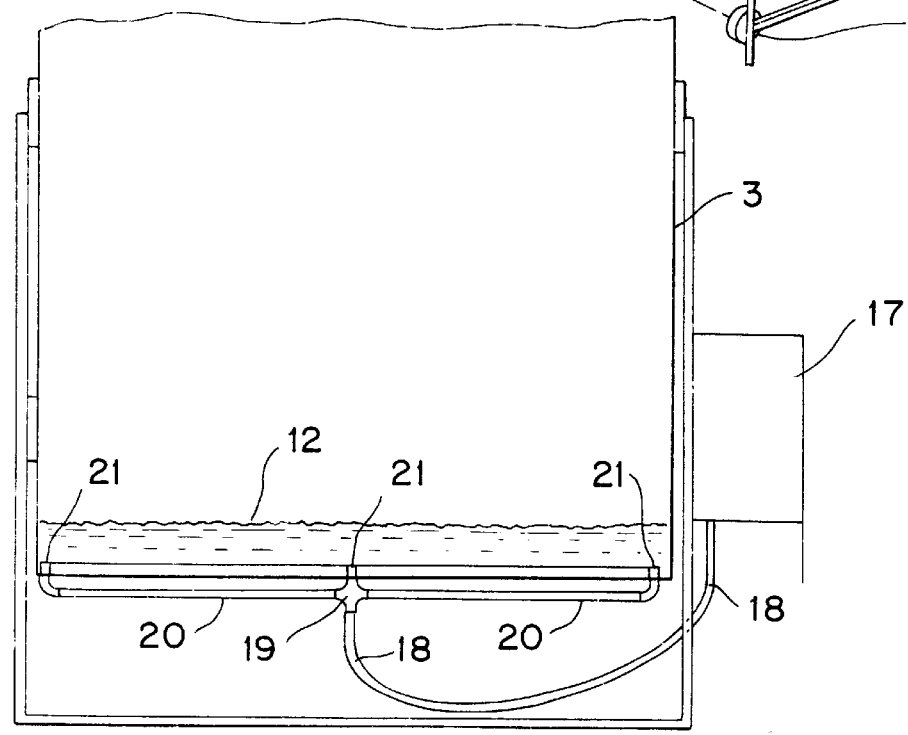
FIG. 5 is a view showing the barbecue sauce reservoir in the operative position.
Figure 6:
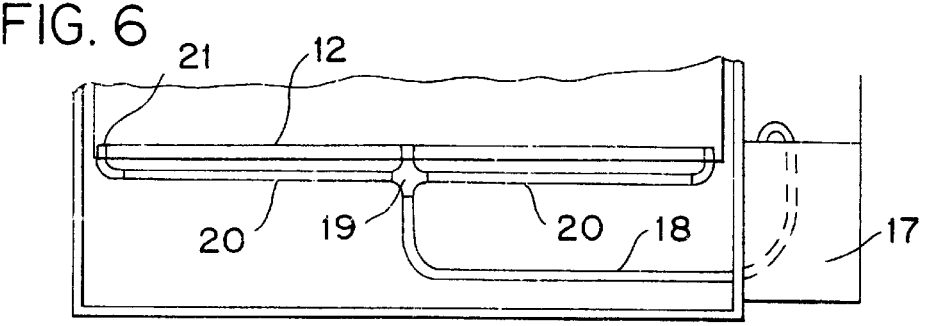
FIG. 6 is a view showing the barbecue sauce reservoir in the inoperative position.

FIGS. 5 and 6 show the reservoir 17 which will hold a supply of the sauce 12. The sauce will be moved from the reservoir 17 to the bottom of the container 3 by a gravity feed. The reservoir 17 will be pivoted to the side of the container 3 by any conventional means. When the reservoir 17 is in the "up" position, shown in FIG. 5, the reservoir will be higher than the bottom of the container 3 and the sauce will flow by gravity through the tubes 18, though fitting 19, into tubes 20, and then through exit ports 21 into the bottom of the container 3. In actual use, the sauce will not be continuously applied to the cooked items. When the food items are first placed on the wheel to be cooked, no sauce will be applied. The food items will be cooked for about an hour (depending on the type of food item being cooked) before any sauce is applied. After that, sauce is applied approximately four time during the final hour of cooking time.

In order to turn off the gravity feed, such as when the grill is being moved from one location to another, or when it is not desirable to apply sauce, the reservoir 17 will be rotated into the "down" position, as shown in FIG. 6. This will position the reservoir 17 below the bottom of the container 3 and gravity will no longer force the sauce into the bottom of the container 3. Obviously, at least the tube 18 should be made from a flexible or resilient material to allow the reservoir to pivot between the "up" and "down" positions.

Although the Rotating Barbecue Grill and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A rotating grill comprising:

a cooking surface to which food items may be secured, said cooking surface being in the shape of a wheel with an outside surface and an inside surface, said food items adapted to be secured to said outside surface of said cooking surface, means for rotating said cooking surface, means for supplying heat to said cooking surface, said means for supplying heat being mounted totally within said cooking surface, and wherein said means for supplying heat also supports said cooking surface.

2. The rotating grill as claimed in claim 1, wherein said rotating grill is mounted within a housing, lid means attached to said housing for enclosing said rotating grill.

3. The rotating grill as claimed in claim 1, wherein said grease shield is mounted above said means for supplying heat to said cooking surface.

4. The rotating grill as claimed in claim 1, wherein said means for supplying heat to said rotating grill comprises combustion tubes, each of which has apertures therein for allowing a heating fuel to exit.

5. The rotating grill as claimed in claim 2, wherein said housing has means for holding a cooking sauce therein, said means for holding a cooking sauce being positioned near a bottom portion of said housing.

6. The rotating grill as claimed in claim 2, wherein said lid means is hinged to said housing.

7. The rotating grill as claimed in claim 1, wherein said means for supplying heat to said cooking surface is positioned along an axis of said cooking surface.

8. A rotating grill comprising:

a cooking surface to which food items may be secured, said cooking surface being in the shape of a wheel with an outside surface and an inside surface, said food items adapted to be secured to said outside surface of said cooking surface, means for rotating said cooking surface, means for supplying heat to said cooking surface, said means for supplying heat being mounted totally within said cooking surface, and wherein a grease shield is attached to said rotating grill, said grease shield being mounted adjacent said inside surface of said cooking surface, and wherein said means for supplying heat to said rotating gill comprises two pipes, each of which has apertures therein for allowing a heating fuel to exit from an interior of said two pipes, and wherein said housing has means for holding a cooking sauce therein, said means for holding a cooking sauce being positioned near a bottom portion of said housing.

9. The rotating grill as claimed in claim 8, wherein said means for supplying heat also supports said cooking surface.

10. The rotating grill as claimed in claim 8, wherein said housing has reservoir means for supplying cooking sauce to said means for holding cooking sauce, said reservoir means being movable from a first position, where said cooking sauce will not be supplied to said means for holding cooking sauce, to a second position where cooking sauce will be supplied to said means for holding cooking sauce.

11. The rotating grill as claimed in claim 8, wherein said reservoir means is pivoted to said housing.

\* \* \* \* \*